June 24, 1958  D. R. PETERS  2,839,878
MACHINE CONTROL AND TOLERANCE GAUGING DEVICE
Filed Oct. 15, 1954  6 Sheets-Sheet 1

INVENTOR
Donald R. Peters
BY
ATTORNEY

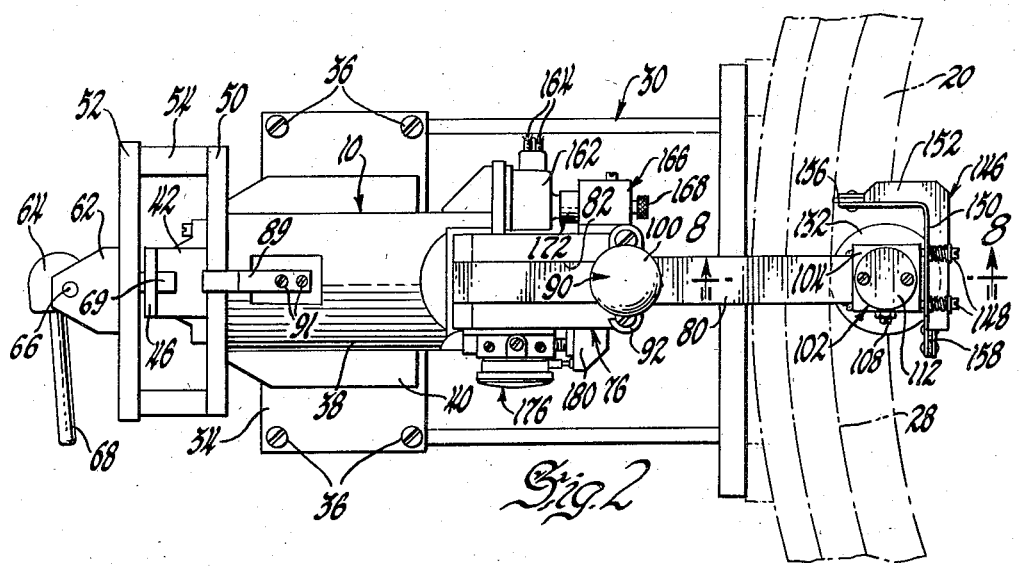

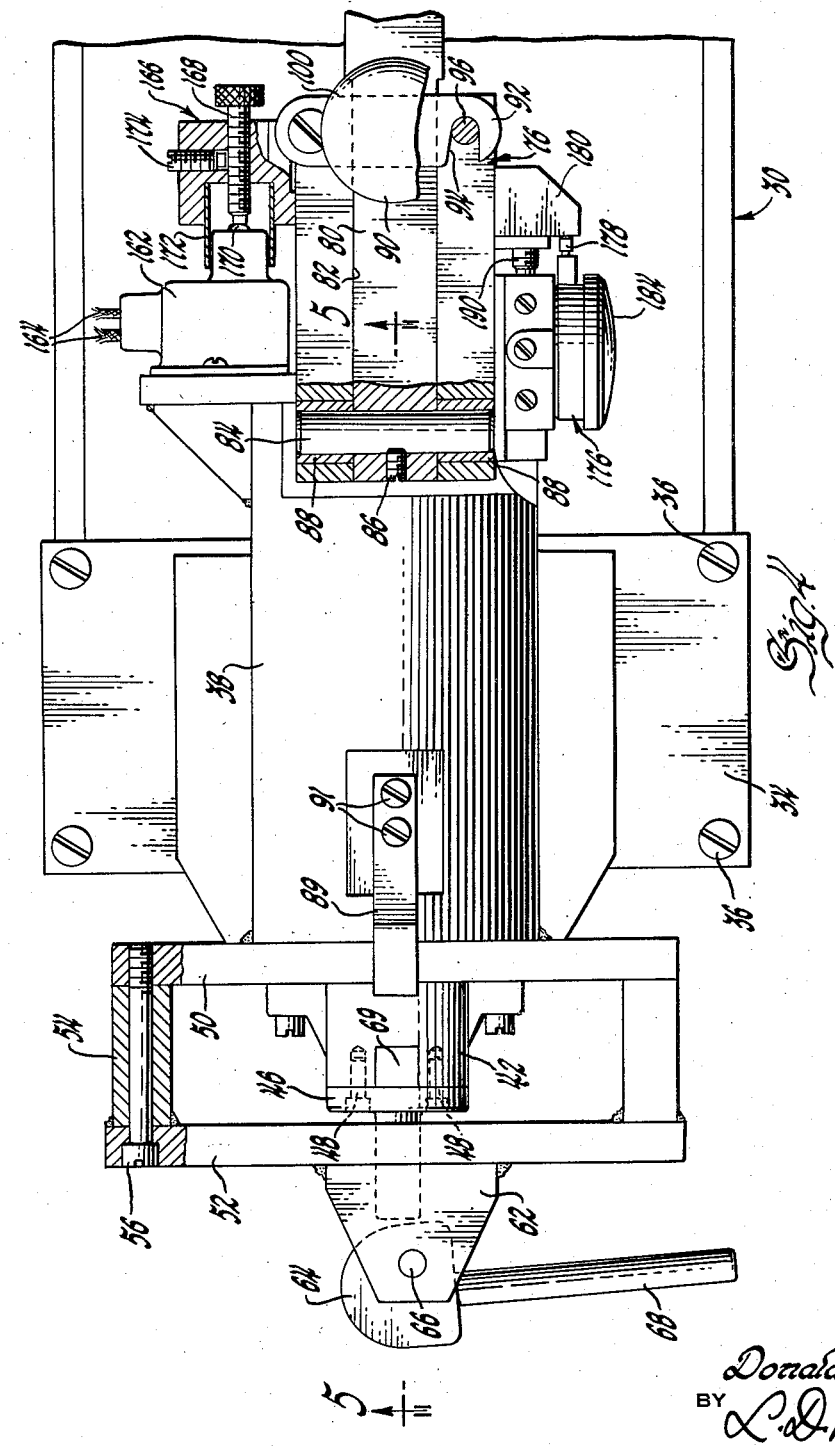

June 24, 1958  D. R. PETERS  2,839,878
MACHINE CONTROL AND TOLERANCE GAUGING DEVICE
Filed Oct. 15, 1954  6 Sheets-Sheet 5

INVENTOR
Donald R. Peters
BY
ATTORNEY

June 24, 1958         D. R. PETERS         2,839,878

MACHINE CONTROL AND TOLERANCE GAUGING DEVICE

Filed Oct. 15, 1954         6 Sheets-Sheet 6

INVENTOR
Donald R. Peters
BY
L. D. Burch
ATTORNEY

United States Patent Office 2,839,878
Patented June 24, 1958

2,839,878

MACHINE CONTROL AND TOLERANCE
GAUGING DEVICE

Donald R. Peters, Brecksville, Ohio, assignor to General
Motors Corporation, Detroit, Mich., a corporation of
Delaware Application October 15, 1954, Serial No. 462,548

3 Claims. (Cl. 51—165)

This invention relates to control devices generally and more particularly to automatic control devices for machine tools used in turning or grinding large diameters or bores.

Close tolerances are required in almost all work. Maintaining a required tolerance is most difficult with machines such as those used in turret ring grinding where an unusually large diameter or bore is required to be ground. Considerable time is lost in stopping a machine, checking tolerances and starting the machine again. The closer the tolerances the more carefully the grinding or turning operation must be performed and consequently the more time consumed in checking such tolerance to maintain prescribed limits.

It is now proposed to provide a device which may be used with turning, grinding or other machine tools to control the operation of the machine tool and at the same time maintain a tolerance check. This device is particularly adapted for checking the internal bore of a large ring member and for such purpose includes an extension arm placing a follower or roller member in rolling contact with the internal surface of the workpiece ring. The extension arm is biased to maintain the roller in contact with the ring at all times. The cutting, grinding or turning operation of the machine tool with which this device is associated is adapted to be stopped or started by the tolerance indication given by the roller or follower engaging the workpiece. Appropriate tolerance gauges may be incorporated within the proposed device to enable a visual check of the performance of the machine and of the extent of turning or grinding yet required to arrive at a prescribed tolerance. The proposed device is adapted to automatically check tolerance and to shut down the operation of the machine when such tolerance is attained.

The proposed device may be associated with any type machine tool in any of a number of locations about the workpiece. This device is simple to manufacture, to set up and to operate and is relatively inexpensive in comparison with the savings in materials, time and effort otherwise expended.

In the drawings:

Figure 2 is a top plan view of the proposed device taken in the plane of line 2—2 of Figure 1 looking in the direction of the arrows thereon.

Figure 3 is an enlarged top plan view of the part of the proposed device engaging the workpiece shown with parts broken away and in cross-section.

Figure 4 is an enlarged top plan view of the major part of the proposed device having certain parts broken away and shown in cross-section.

Figure 1:
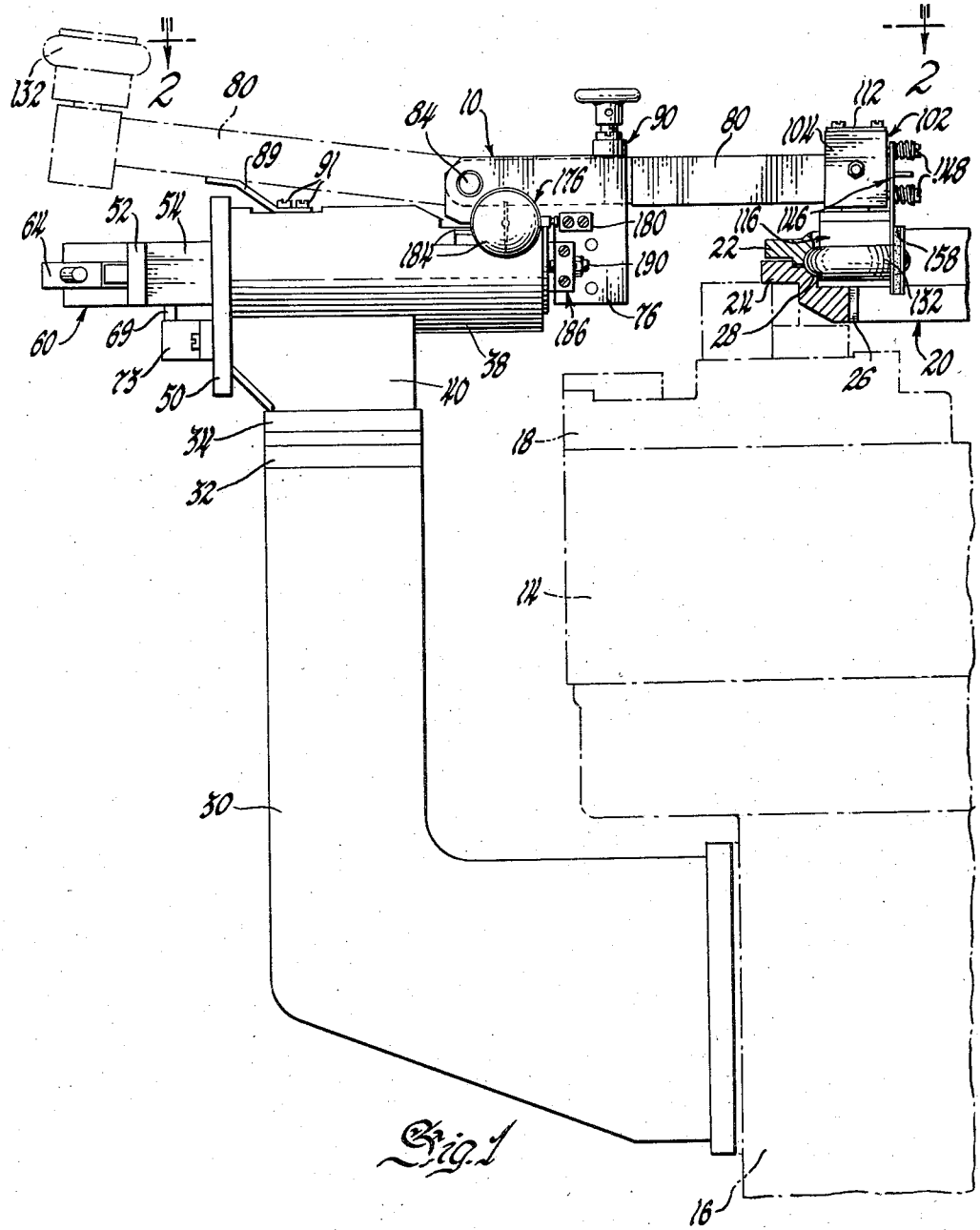
Figure 1 is a side elevational view of the proposed control device and tolerance gauging means as used with a turret ring grinding machine, only part of which is shown.
Figure 5:
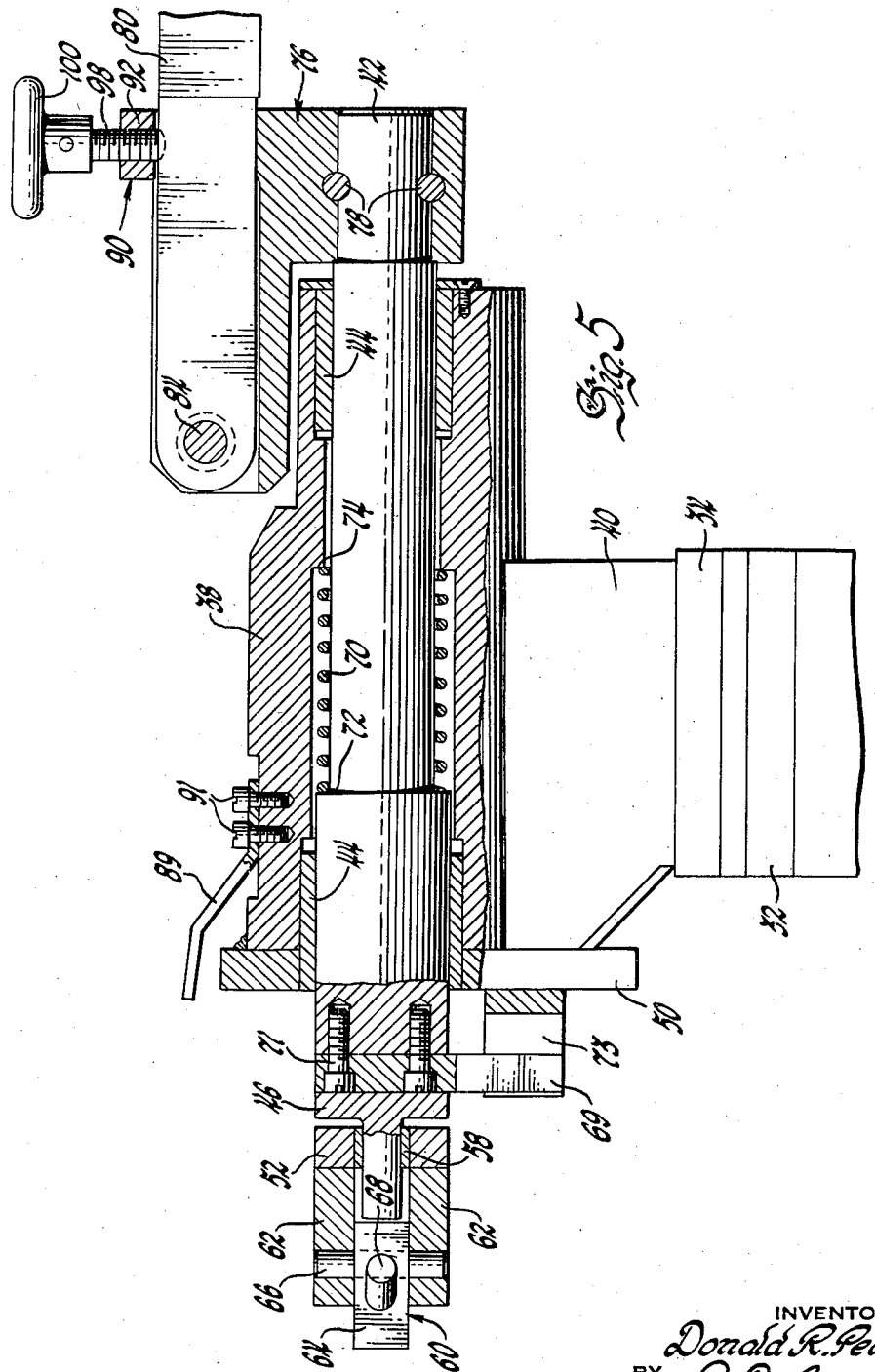
Figure 5 is a cross-sectional view of the proposed device as shown in Figure 4 and taken in the plane of line 5—5 thereon looking in the direction of the arrows.
Figure 6:
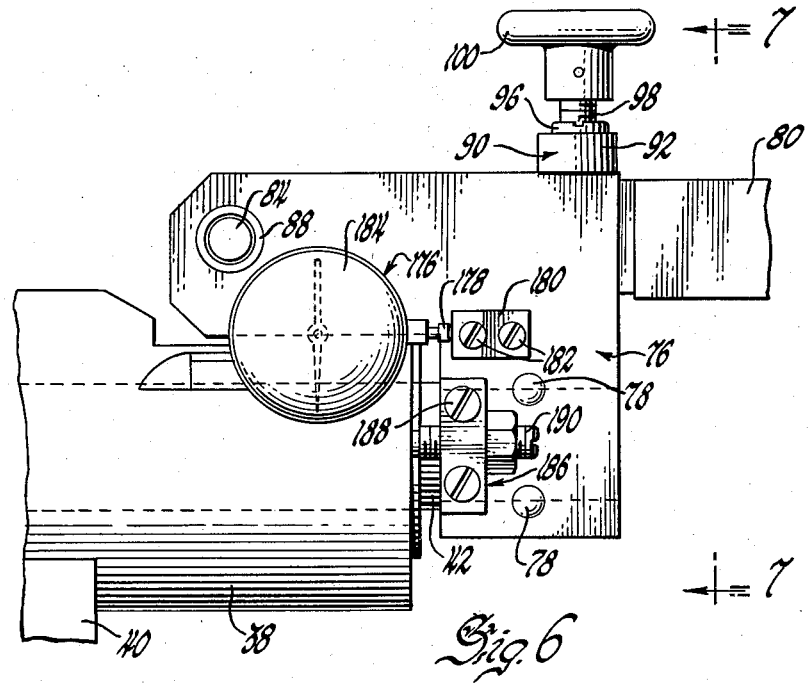
Figure 6 is an enlarged side view of a part of the proposed device showing certain tolerance and control features thereof.
Figure 7:
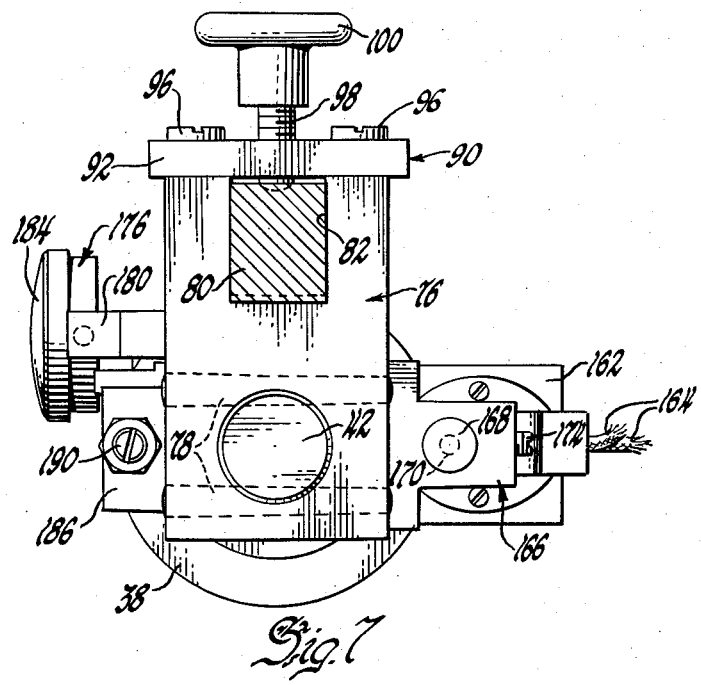
Figure 7 is an end view of the part of the proposed device shown in Figure 6 taken in the plane of line 7—7 thereon and looking in the direction of the arrows.
Figure 8:
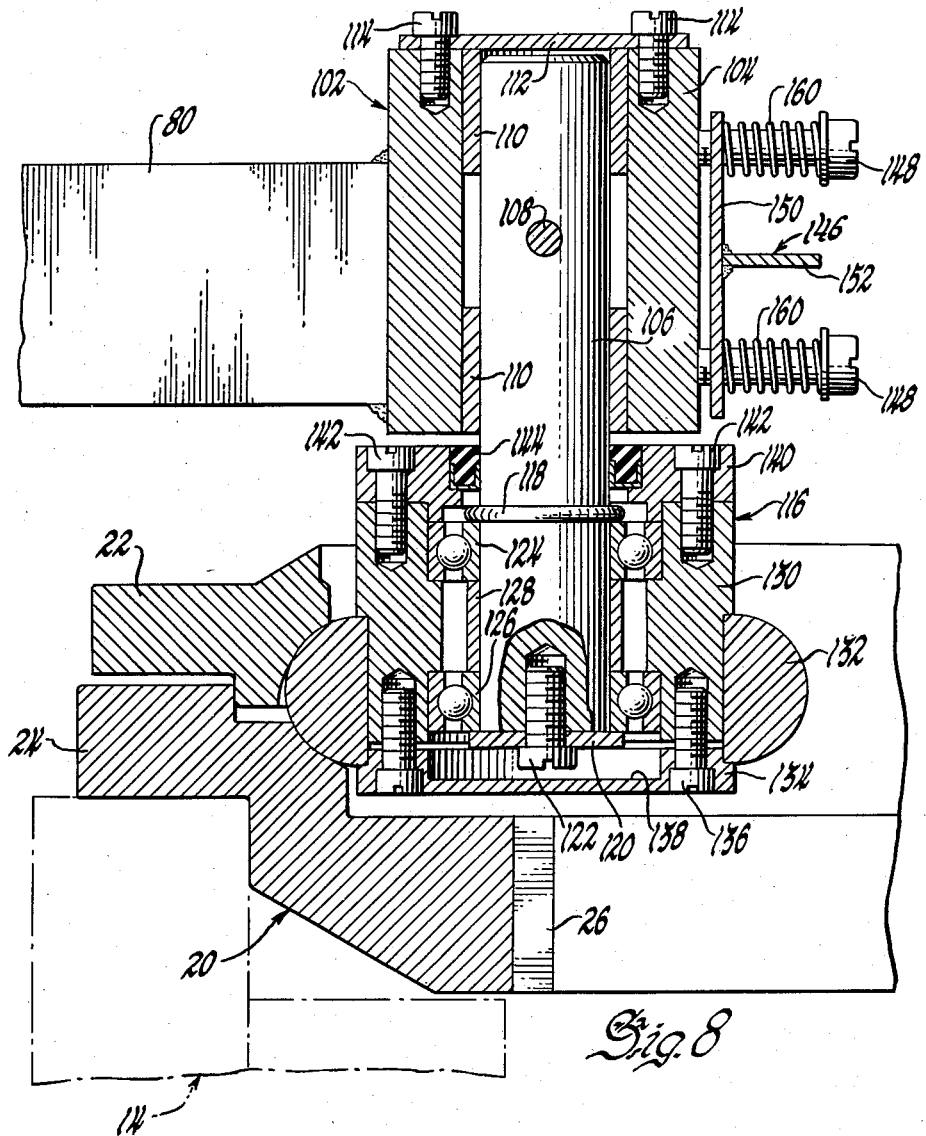
Figure 8 is an enlarged cross-sectional side view of the part of the device shown in Figure 3 and taken in the plane of line 8—8 in Figure 2 and looking in the direction of the arrows thereon.

The control device and tolerance gauge means 10 is adapted to be secured to a machine tool 14. Part of such a tool 14 is shown in Figure 1 to include a base member 16 supporting a worktable 18 and having a workpiece 20 supported thereon. Such workpiece is here shown as comprising two parts 22 and 24 forming a large diameter ring, a segment of which is shown more clearly in Figures 2 and 3. The workpiece 20, in the present instance, is a turret ring including gear teeth 26. The machine tool 14 includes an internal cutting or grinding device which is not shown in the drawings, but which is adapted to grind away or turn down the work surface 28.

The control device and tolerance gauging means 10 includes a support member 30 which is secured to the base 16 of the machine tool 14 and extends outwardly and up along the vertical side of the machine tool. Such support 30 may be secured at any desired position around the base 16 of the machine tool 14. The upper end 32 of the support member 30 includes a base plate 34 secured thereto by fastening means 36. A transversely disposed cylindrical housing or casing 38 is secured to the base plate 34 by a support member 40 formed as a part of the housing 38 or secured thereto, and which is supported upon and secured to the base plate 34.

An elongated slide block or bolt member 42 is mounted within the cylindrical housing 38 and extends axially therethrough. The slide member 42 is mounted within guides 44 disposed at opposite ends of the housing 38 which allow reciprocal movement while holding the member against rotation. An actuator member 46 is secured to one end of the slide member 42 by fastening means 48. An end plate 50 is secured to one end of the cylindrical housing 38 and has a support plate 52 secured in parallel spaced relation thereto by spacers 54 and fastening means 56. The end of the actuator member 46 is received through the support plate 52 which includes a bearing sleeve 58. Actuating means 60 are secured to the support plate 52 and include spaced brackets 62 receiving the end of the actuator member 46 therebetween and having an eccentric cam 64 mounted therebetween on a pin 66. A control or actuating lever arm 68 is secured to the cam 64. Rotation of the cam 64 by means of the lever arm 68 causes the cam to engage the end of the actuator arm 46 and to move the slide member 42 axially within the housing 38.

A depending lug 69 is secured by fastening means 71 in the end of the slide member 42 and is adapted to be engaged within a bracket 73 limiting forward travel of the slide member. A coil spring 70 is disposed about the slide member 42 within the housing 38 and extends between and abuts against a shoulder 72 formed on the slide member and a shoulder 74 formed within the housing to bias the slide member in a rearwardly or retracted position whereby the actuator 46 is normally held in engagement with the eccentric cam 64.

A carrier member 76 is secured as by keys or pins 78 to the end of the slide member 42 extended beyond the other end of the housing 38. An extension arm 80 is mounted upon the carrier member 76 and is extended horizontally outward well beyond the housing member 38. The extension arm 80 is received within a longitudinal groove 82 formed in the top of the carrier member 76 and is secured to the carrier member at one end by a pivot pin 84. The pivot pin 84 is secured by a set screw 86 to the arm 80 and is received within bearing means 88 provided in the carrier member 76. Such connection allows the arm 80 to be pivoted out of the way as shown in phantom in Figure 1. A bracket 89 secured by fastening means 91 to the top of housing 38 supports the arm as retracted in such position. The arm 80 may be secured against relative movement with respect to the carrier member 76 in its normal position by latching means 90 which include a latch arm 92 pivotally mounted on one side of the groove 82 and having the other end formed as at 94 to engage a stop or latch pin 96. Set screw means 98 are threaded through the latch arm 92 and include a knob 100 for setting the screw down to engage the extension arm 80 and holds it securely to the carrier member 76.

A follower device 102 is secured to the far end of the extension arm 80. The extension arm 80 extends over the workpiece 20 and is adapted to dispose the follower device 102 within the workpiece diameter. The follower device 102 includes a member 104 secured to the end of the arm with a vertically disposed stub shaft 106 mounted therein and secured thereto by a single fastening means 108 extended through one side of such member. The stub shaft is centered within the member 104 by blocks 110 provided at the top and bottom thereof. A cover plate 112 is secured over the top of the member 104 by fastening means 114 to keep out dirt and other foreign matter.

Roller means 116 are mounted on the end of the stub shaft 106. The stub shaft 106 is formed with a collar 118 near its downwardly extending end and has a ball bearing retainer disk 120 secured by fastening means 122 to the lower end thereof. Ball bearing members 124 and 126 are mounted on the shaft 106 and are spaced apart between the collar 118 and retainer 120 by spacer sleeve 128. The outer races of the bearings 124 and 126 are engaged with and support a sleeve member 130. A tore shaped metallic contact member 132 is secured to the lower end of the sleeve 130 by an end plate 134 secured to the sleeve by fastening means 136. The end plate 134 being rotatable with the sleeve 130 about the stub shaft 106 is hollowed out as at 138 to prevent interference with the lower end of the shaft and the bearing retainer 120 and fastening means 122 secured thereto. A sealing ring retainer 140 is secured to the upper end of the sleeve 130 by fastening means 142 and supports a sealing ring 144 which engages the stub shaft 106 to prevent dirt and foreign matter from collecting about the bearing means.

A wiper support member 146 is secured to the follower device 102 by fastening means 148. The wiper support member 146 includes a plate 150 reinforced by an angle arm 152 and is formed to provide a transversely extended arm 154 having a wiper blade 156 secured thereto which extends beyond the roller means 116 to engage the work surface 28 of the workpiece 20 being machined. The other end of the wiper support member 146 has another wiper blade 158 secured thereto which is disposed in wiping engagement with the tore shaped contact member 132 of the roller means 116. The wiper support member 146 is movable relative to the follower device 102 against spring members 160 disposed about the fastening means 148 between the head of the fastening means and the side of the wiper support member 146. This assures engagement of the wiper blades 156 and 158 with the workpiece 20 and the contact member 132 without concern for the wearing away of such wiper blades due to their contact with the relative moving members with which they are engaged.

A machine tool control switch 162 is secured to the housing member 38 and is adapted to start or stop the machine tool 14 by means of its connection to the electrical circuit thereof, which is not shown, through electrical leads 164. A stop or limit member 166 is secured to the side of the carrier member 76 and includes a threaded adjustment screw 168 aligned with and adapted to engage the control button 170 of switch 162. The limit stop 166 also includes a shielding sleeve 172 disposed about the end of the adjustment screw 168 and the control button switch 162 to prevent foreign matter from collecting between the adjustment screw and the control button. Set screw means 174 are provided to lock the adjustment screw 168 in its preselected adjusted position.

A tolerance gauge 176 including an actuating plunger 178 is secured to the housing 38. The plunger 178 engages an extended lug 180 secured to the carrier member 76 as by fastening means 182. Relative movement of the carrier member 76 with respect to the housing 38 is indicated by the dial 184 of the tolerance gauge.

Another limit stop 186 is secured to the carrier member 76 as by fastening means 188 and includes a set screw 190 adapted to engage the end of the housing 38 and to limit the extent of travel of the carrier 76 relative to the housing 38 and consequently of the follower device 102 secured to the end of the extension arm 80.

The control device and tolerance gauging means 10 here described is used with a machine tool 14 in the following manner. The support member 30 is secured to the base 16 of a machine tool 14 and is adapted to dispose the housing member 38 at the level of the machine tool table 18 or the workpiece 20 supported thereon. Such disposition enables the extension arm 80 to extend over the workpiece 20 and to dispose the follower device 102 within the workpiece.

The eccentric cam 64 is first moved to engage the actuator 46 and to move the slide member 42 and the carrier member 76 secured thereto to a forwardly extended position. The extension arm 80 may then be moved from its retracted position to dispose the follower device 102 within the workpiece 20 without interference with the workpiece. The latching means 90 are then brought into place to hold the extension arm 80 securely to the carrier member 76.

The cam 64 is then moved to allow the slide member 42 to be retracted which in turn moves the tore contact member 132 into engagement with the workpiece 20. The wiper blade 156 is at the same time brought into engagement with the work surface 28 of the workpiece. The other wiper blade 158 is engaged with the contact member 132.

The tolerance gauge 176 is preset to the prescribed tolerance requirement and will indicate the amount of work to be done on the workpiece 20 through its plunger 178 which engages the contact lug 180 of the carrier member 76. The set screw 190 is also preset to limit the extent of retracted travel of the extension arm 80 and associated members. The set screw 190 prevents the engagement of the carrier 76 with the end of the housing 38 and excessive force upon the plunger 178 of the tolerance gauge 176 thereby enabling the use of a much stronger retraction spring 70 within the housing member 38 for biasing the contact member 132 of the follower device 102 against the workpiece 20. This in turn assures a more firm gauging contact with the workpiece and enables machining to closer tolerances. The adjustment screw 168 adapted to actuate the machine control switch 162 is also preset and locked by the set screw 174 to assure stopping the machining operation when the prescribed tolerance is obtained.

With the limit stops 166 and 186 set and the contact member 132 in engagement with the workpiece 20, the machining operation may be started. As the workpiece 20 is moved past the control device 10 in the course of turning down the work surface 28, the contact member 132 is held in engagement with the work surface. Since the contact member 132 is part of roller means 116 including sleeve 130 mounted on bearing means 124 and 126, the contact member is maintained in rolling contact with the work surface 28. The wiper blades 156 and 158 are disposed to keep the work surface 28 and the contact tore 132 clean. As the workpiece 20 is turned down, the carrier member 76 being a fixed part of the follower device 102 is retracted by the biasing spring 70 acting upon the slide block member 42. As the carrier member 76 is moved towards the housing 38 the adjustment screw 168 is moved closer to the control button 170 of the switch 162. When the workpiece 20 has been turned down to the prescribed tolerance, the adjustment screw 168 actuates the switch 162 and stops the machining operation. The machine tool operator may maintain a visual inspection by means of the tolerance gauge 176 of the extent of machining performed and may be assured that the prescribed tolerances have been attained when the machining operation is stopped by checking the dial of such gauge.

I claim:

1. A machine tool control and work gauging device, said device being adapted for use with a machine tool having a base and being adapted to support a ring member and to work the inner periphery of said ring member, said device comprising a fixture adapted to be secured to the base of said machine tool and including a guide member disposed in the plane and radially of said ring member, a slide member operatively engaged by said guide member, an arm member pivotally mounted upon said slide member and extending over said ring member, roller means mounted on the end of said arm member and depending to within said ring member and having a surface for engaging said ring member in rolling contact, means biasing said slide member away from said ring member and thereby holding said roller means in rolling engagement with the inner periphery of said ring member via said arm, and adjustable gauging and limit stop means mounted upon said slide and guide members and cooperatively disposed to gauge and signal the machine tool work limits in accord with the axial movement of said slide member.

2. The machine tool control device of claim 1 including a wiper fixture secured to the end of said arm member and having wiper blades disposed at opposite ends thereof, one of said blades engaging said roller means rolling contact engagement surface prior to its engagement with said ring member and the other of said blades engaging said ring member prior to engagement with said roller.

3. For use with a machine tool adapted to work the inner periphery of a workpiece having a generally annular configuration, a machine tool control and work gauging device, said device comprising, a support member, a slide member supported by said support member for axial movement relative thereto, an arm member pivotably mounted on slide member and having one end thereof extendable over said workpiece in radial relation thereto, rolling contact means mounted on said arm one end and being adapted to depend within said annular workpiece and engage the inner periphery thereof, means biasing said slide member and said arm member and said rolling contact means so that said rolling contact means is engageable with the inner periphery of said workpiece whereby said slide member is adapted to be moved axially in accordance with said workpiece inner periphery, and adjustable gauging and limit stop means mounted on said slide member and said support member and disposed to gauge and signal working limits to said machine tool in accordance with the axial movement of said slide member.

References Cited in the file of this patent
UNITED STATES PATENTS

| | | |
|---|---|---|
| 1,284,017 | Wittstein | Nov. 5, 1918 |
| 1,305,878 | Carpmael et al. | June 3, 1919 |
| 1,926,603 | Stowell | Sept. 12, 1933 |
| 2,280,692 | Elberty | Apr. 21, 1942 |
| 2,589,620 | Leffel | Mar. 18, 1952 |
| 2,641,058 | McCormack | June 9, 1953 |